United States Patent
Chen (10) Patent No.: US 12,184,198 B2
(45) Date of Patent: Dec. 31, 2024

(54) SWITCHING POWER SUPPLY CURRENT SENSING, ZERO-CROSSING DETECTION AND OVERVOLTAGE PROTECTION

(71) Applicant: Silergy Semiconductor Technology (Hangzhou) LTD, Hangzhou (CN)

(72) Inventor: Chaojun Chen, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 164 days.

(21) Appl. No.: 17/895,272

(22) Filed: Aug. 25, 2022

(65) Prior Publication Data

US 2023/0067735 A1 Mar. 2, 2023

(30) Foreign Application Priority Data

Aug. 26, 2021 (CN) .......................... 202110987382.1

(51) Int. Cl.
   *H02M 3/156* (2006.01)
   *H02M 1/00* (2006.01)
   *H02M 1/32* (2007.01)
   *H02M 3/335* (2006.01)
   *H02M 7/217* (2006.01)

(52) U.S. Cl.
   CPC ......... *H02M 7/217* (2013.01); *H02M 1/0009* (2021.05); *H02M 1/32* (2013.01); *H02M 3/33523* (2013.01)

(58) Field of Classification Search
   CPC ...... H02M 1/0009; H02M 1/32; H02M 7/217; H02M 3/33523
   See application file for complete search history.

(56) References Cited

U.S. PATENT DOCUMENTS

| | | | |
|---|---|---|---|
| 6,005,780 A | 12/1999 | Hua | |
| 6,370,045 B1 * | 4/2002 | Lurkens | H02M 1/10 323/299 |
| 6,580,258 B2 | 6/2003 | Wilcox et al. | |
| 9,166,470 B2 * | 10/2015 | Kelly | H02M 3/156 |
| 9,325,254 B2 | 4/2016 | Deng et al. | |
| 9,331,588 B2 | 5/2016 | Chen | |
| 9,488,680 B2 | 11/2016 | Xu | |
| 10,622,887 B1 * | 4/2020 | Xiong | H02M 3/33523 |
| 2010/0225290 A1 * | 9/2010 | Nalbant | H02M 3/156 323/282 |
| 2014/0078789 A1 | 3/2014 | Li et al. | |
| 2014/0239934 A1 | 8/2014 | Zhang | |

(Continued)

FOREIGN PATENT DOCUMENTS

| | | |
|---|---|---|
| CN | 102231605 A | 11/2011 |
| CN | 106130378 A | 11/2016 |
| CN | 107968569 A | 4/2018 |

*Primary Examiner* — Harry R Behm (57) ABSTRACT

A control circuit for a switching power supply, can include: a sampling circuit configured to obtain an inductor current and a drain-source voltage of a main power transistor in a power stage circuit, in order to generate a sampling signal; where the control circuit generates an inductor current sampling signal according to the sampling signal during an on-period of the main power transistor; and where during an off-period of the main power transistor, the control circuit generates a zero-crossing signal of the inductor current and an overvoltage signal of an output voltage of the switching power supply according to the sampling signal.

15 Claims, 6 Drawing Sheets

(56) References Cited

U.S. PATENT DOCUMENTS

| | | |
|---|---|---|
| 2015/0160270 A1 | 6/2015 | Shi et al. |
| 2015/0280578 A1 | 10/2015 | Huang et al. |
| 2021/0175804 A1* | 6/2021 | Shumkov ............ H02M 3/1582 |
| 2021/0376714 A1* | 12/2021 | Tsou .................... G01R 19/175 |

* cited by examiner

FIG. 1 (conventional)

FIG. 2 (conventional)

SWITCHING POWER SUPPLY CURRENT SENSING, ZERO-CROSSING DETECTION AND OVERVOLTAGE PROTECTION

RELATED APPLICATIONS

This application claims the benefit of Chinese Patent Application No. 202110987382.1, filed on Aug. 26, 2021, which is incorporated herein by reference in its entirety.

FIELD OF THE INVENTION

The present invention generally relates to the field of power electronics, and more particularly to control circuits and associated switching power supplies.

BACKGROUND

A switched-mode power supply (SMPS), or a "switching" power supply, can include a power stage circuit and a control circuit. When there is an input voltage, the control circuit can consider internal parameters and external load changes, and may regulate the on/off times of the switch system in the power stage circuit. Switching power supplies have a wide variety of applications in modern electronics. For example, switching power supplies can be used to drive light-emitting diode (LED) loads.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

Figure 1:
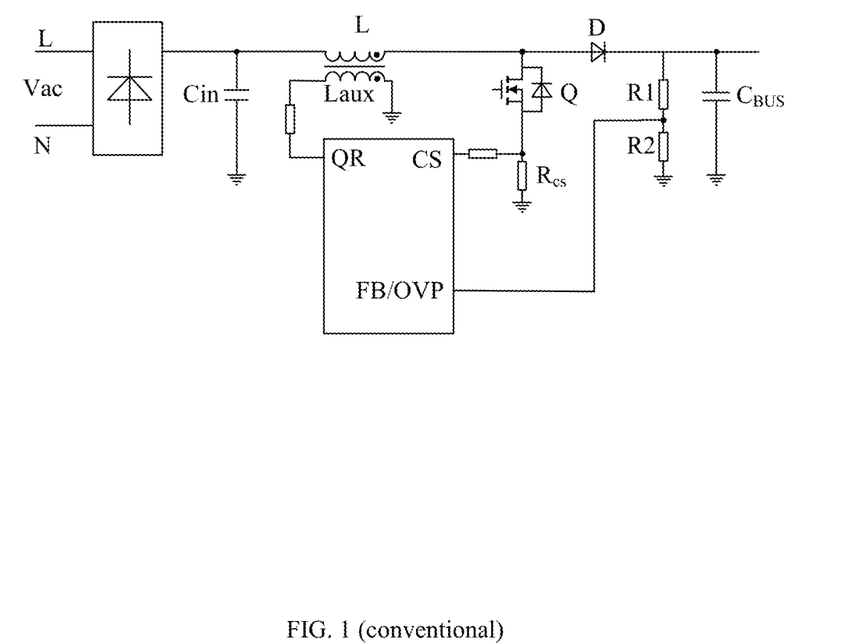
FIG. 1 is a schematic block diagram of a first example switching power supply.

Referring now to FIG. 1, shown is a schematic block diagram of a first example switching power supply. In this example, the switching power supply can include a power factor correction (PFC) controller. The PFC controller uses auxiliary winding Laux to detect the zero-crossing moment of the current flowing through inductor L to control a power transistor in the switching power supply, in order to realize valley switching. In addition, sampling resistor $R_{CS}$ can connect in series with the source of power transistor Q, in order to sample the inductor current for current control and overcurrent protection. After the output voltage is divided by the resistor, a divided voltage may be configured as a feedback signal for output voltage control and a detection signal for the first stage output overvoltage protection (OVP).

Figure 2:
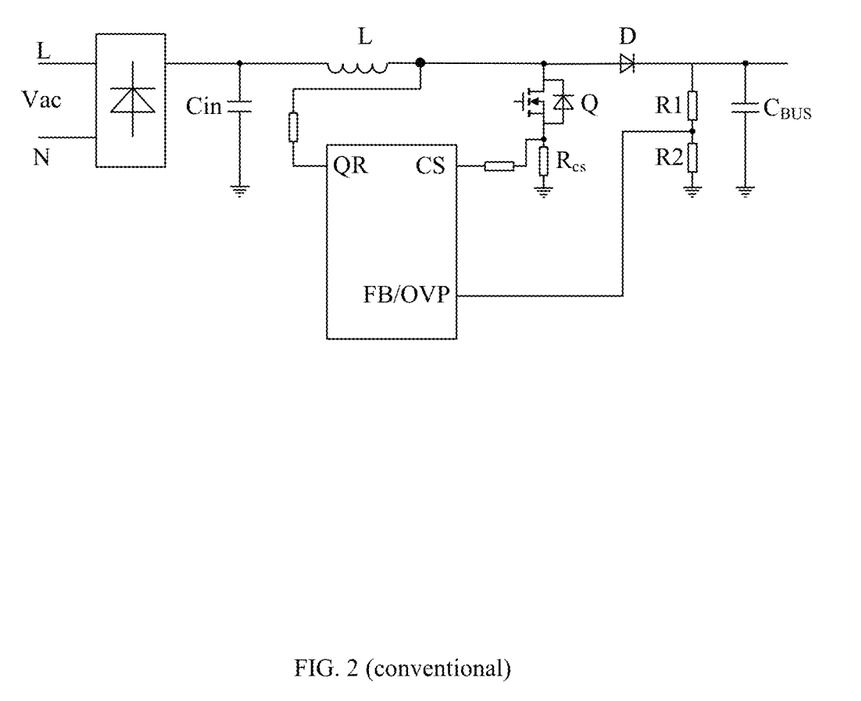
FIG. 2 is a schematic block diagram of a second example switching power supply.

Referring now to FIG. 2, shown is a schematic block diagram of a second example switching power supply. Some PFC controllers directly samples drain-source voltage Vdrain of power transistor Q at the drain of power transistor Q, and differentiate drain-source voltage Vdrain by a capacitor inside the controller, in order to realize valley switching. In addition, sampling resistor $R_{CS}$ can connect in series with the source of the power transistor, in order to sample the inductor current for current control and overcurrent protection. After the output voltage is divided by the resistor, a divided voltage can be configured as a feedback signal for output voltage control and a detection signal for the first stage output OVP.

However, the above two control schemes have common shortcomings. In a first aspect, both require an additional pin to realize the valley switching function. In a second aspect, there is only one stage output overvoltage protection. Since the voltage at pin FB is simultaneously configured as a control parameter of the voltage closed-loop feedback, the output overvoltage of the switching power supply can occur when the resistance value of the voltage divider resistor is wrong or the resistance value fails, and the overvoltage protection through pin FB may not work, thus affecting the safety of the system. Further, if a second stage output overvoltage protection is added to make the system more secure, an additional pin needs to be added, which is not conducive to integrated design.

Figure 3:
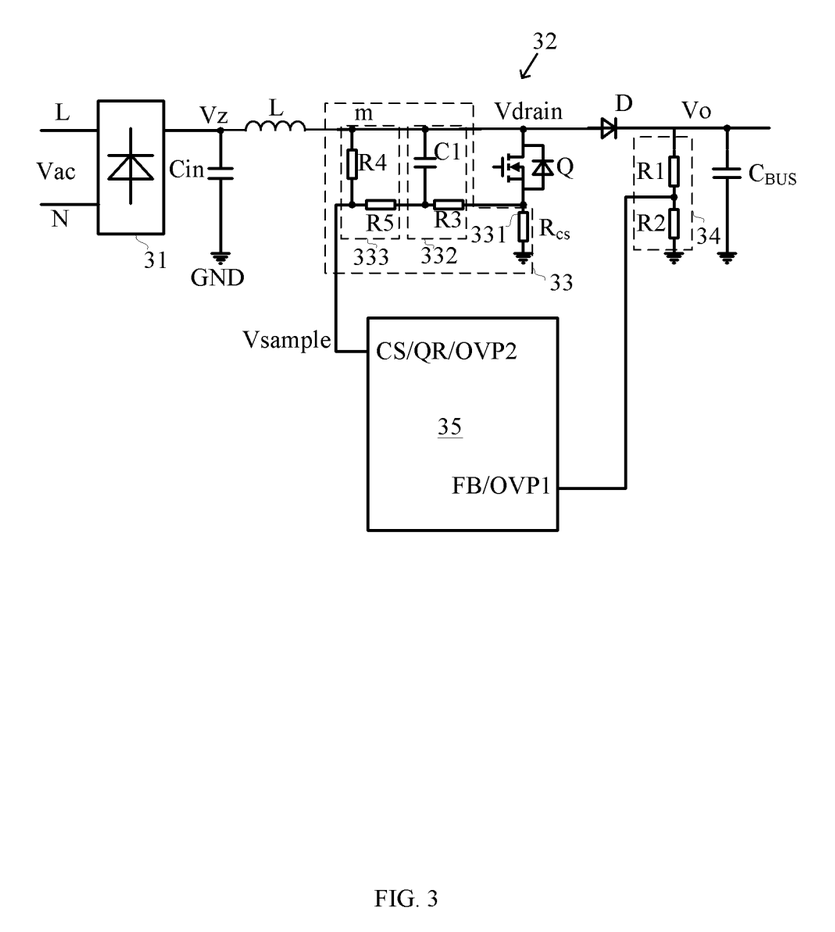
FIG. 3 is a schematic block diagram of a first example switching power supply, in accordance with embodiments of the present invention.

Referring now to FIG. 3, shown is a schematic block diagram of a first example switching power supply, in accordance with embodiments of the present invention. In this particular example, the switching power supply can include rectifier circuit 31 and power stage circuit 32. Rectifier circuit 31 can receive AC input voltage Vac, which is usually a sinusoidal waveform, in order to rectify AC input voltage Vac into DC input voltage Vz (that is, the so-called steamed bread wave). Rectifier circuit 31 can be implemented by any suitable rectifier circuits, such as a half-bridge rectifier circuit or a full-bridge rectifier circuit. Input capacitor Cin can be coupled between rectifier circuit 31 and ground terminal GND. Power stage circuit 32 coupled to rectifier circuit 31 can include at least one main power transistor Q, can be coupled to rectifier circuit 31, and may receive DC input voltage Vz to convert DC input voltage Vz into the required output voltage Vo or the required output current Io to be supplied to the load or the subsequent circuit. The control circuit may generate switching control signal GATE according to the feedback signals of the voltage and current in power stage circuit 32 to control the conduction state of main power transistor Q in the power stage circuit, such that the output signal of the switching power supply meets circuit requirements. In this example, the control circuit can include sampling circuit 33 and control chip 35.

Here, the switching power supply is described by taking a power factor correction circuit in which power stage circuit 32 adopts a boost (BOOST) topology as an example. In FIG. 3, power stage circuit 32 can include inductor L for energy storage, main power transistor Q, diode D, and output capacitor CBUS. Inductor L can connect between the input terminal and middle node "m" of power stage circuit 32. Main power transistor Q can connect between middle node m and the ground terminal. Diode D can connect between middle node m and the output terminal, and may rectify the inductor current from inductor L. Output capacitor CBUS can connect between the output terminal and the ground terminal for filtering output voltage Vo. Main power transistor Q can be controlled by switching control signal GATE (e.g., connected to the gate of transistor Q) to switch between on and off states, in order to control the change of the inductor current and correct the power factor in an active manner. Those skilled in the art will recognize that power stage circuits in other known topologies, such as buck topology (BUCK), buck-boost topology (BUCK-BOOST) and flyback (FLYBACK) topology, can also be utilized in certain embodiments.

The power factor correction circuit may also include an input circuit. For example, the input terminal of the input circuit can connect to the power supply grid to receive AC input voltage Vac, and the output terminals of the input circuit may respectively be connected to input terminals L and N of rectifier circuit 31. Rectifier circuit 31 may obtain the electric energy in the power supply grid through the input circuit, and then can rectify and output DC input voltage Vz. For example, the input circuit may include a "π" type low-pass filter including two capacitors and one inductor. Typically, the input frequency bandwidth of the low-pass filter is lower than the switching frequency of the switching power supply, but higher than the supply frequency of the mains voltage. The output terminals of the low-pass filter can connect to the two input terminals of rectifier circuit 31.

Control chip 35 can also include a detection circuit therein, and sampling circuit 33 may acquire inductor current IL and the drain-source voltage of main power transistor Q in power stage circuit 32, in order to generate sampling signal Vsample. Further, the control circuit may obtain inductor current sampling signal IL1 representing inductor current IL and overcurrent signal $V_{OCP}$ in power stage circuit 32 according to sampling signal Vsample during the conduction period of main power transistor Q. Also, during the period when main power transistor Q is turned off, according to sampling signal Vsample, zero-crossing signal $V_{ZERO}$ and overvoltage signal $V_{OVP}$ of inductor current IL can be obtained.

Particular embodiments aim to improve the utilization rate of the pins of the control chip, and also enrich the functionality of the control chip. Therefore, the control circuit of this example can transmit sampling signal Vsample to the detection circuit inside control chip 35 through multiplexed detection pin CS/QR/OVP2. The detection circuit may receive sampling signal Vsample and accordingly generate inductor current sampling signal IL1, overcurrent signal Voce, zero-crossing signal $V_{ZERO}$, and overvoltage signal $V_{OVP}$.

As shown in FIG. 3, sampling circuit 33 can include current sampling circuit 331, differential circuit 332, and voltage divider circuit 333. In this example, current sampling circuit 331 can obtain inductor current IL in power stage circuit 32 and generate inductor current sampling signal ILL such that the overcurrent information of inductor current IL can be obtained according to inductor current sampling signal IL1, thereby realizing overcurrent protection. In this example, current sampling circuit 331 may sample the inductor current by connecting sampling resistor $R_{CS}$ in series with the source of main power transistor Q, and can generate inductor current sampling signal IL1 at both terminals of sampling resistor $R_{CS}$. Further, current sampling circuit 331 may acquire inductor current sampling signal IL1 representing inductor current IL during the conduction period of main power transistor Q.

Of course, it can be understood that connecting sampling resistor $R_{CS}$ in series with the source of main power transistor Q is only to facilitate the direct acquisition of current sampling signal ILL In other examples, sampling resistor $R_{CS}$ can also be set at other positions in the inductor current loop. Further, it can be understood that current sampling circuit 331 can also adopt any suitable current sampling manner in certain embodiments.

In particular embodiments, differential circuit 332 can obtain differential signal Vdiff by differentiating drain-source voltage Vdrain of main power transistor Q during the off period of main power transistor Q, such that the information representing the zero-crossing of inductor current IL can be obtained according to differential signal Vdiff, in order to achieve valley switching. The first terminal of differential circuit 332 can connect to the drain of main power transistor Q, the second terminal of differential circuit 332 can connect to the source of main power transistor Q. That is, the output terminal of current sampling circuit 331, and the third terminal of differential circuit 332 can connect to multiplexer detection pin CS/QR/OVP2.

Differential circuit 332 can also include capacitor C1 and resistor R3, where the first terminal of capacitor C1 can connect to the drain of main power transistor Q, the second terminal of capacitor C1 can connect to one terminal of resistor R3, and the other terminal of resistor R3 can connect to the source of main power transistor Q, where the second terminal of capacitor C1 can also connect to multiplexer detection pin CS/QR/OVP2.

In an example, voltage divider circuit 333 can divide drain-source voltage Vdrain of main power transistor Q to obtain voltage division signal VFB2 during the off period of main power transistor Q, such that the overvoltage information of output voltage Vo can be obtained according to voltage division signal VFB2, in order to realize the second stage overvoltage protection. The first terminal of voltage divider circuit 333 can connect to the drain of main power transistor Q, the second terminal of voltage divider circuit 333 can connect to the source of main power transistor Q through differential circuit 332, and the third terminal of voltage divider circuit 333 can connect to multiplexer detection pin CS/QR/OVP2, and voltage division signal VFB2 can be generated at the third terminal of voltage divider circuit 333.

Voltage divider circuit 333 can also include resistors R4 and R5. Here, the first terminal of resistor R4 can connect to the drain of main power transistor Q, and the second terminal of resistor R4 can connect to one terminal of resistor R5, and the other terminal of resistor R5 can connect to a common node of resistor R3 and capacitor C1 in differential circuit 332, where the second terminal of resistor R4 can also connect to multiplexer detection pin CS/QR/OVP2. Voltage divider circuit 333 may be arranged at the rear stage of differential circuit 332. In addition to dividing drain-source voltage Vdrain, resistor R5 can also limit the current of differential signal Vdiff transmitted to multiplexer detection pin CS/QR/OVP2 of control chip 35 by differential circuit 332.

It should be noted here that voltage divider circuit 333 and differential circuit 332 can also exchange positions. Further, the first terminal of voltage divider circuit 333 can also connect to the drain of main power transistor Q, the second terminal of voltage divider circuit 333 can connect to the source of main power transistor Q, and the third terminal of voltage divider circuit 333 can connect to multiplexer detection pin CS/QR/OVP2 through differential circuit 332. Adaptively, in this connection mode, sampling circuit 33 may also include an additional current limiting resistor to limit the current of differential signal Vdiff, and differential circuit 332 can connect to multiplexer detection pin CS/QR/OVP2 through the current limiting resistor.

In addition, the control circuit can also include voltage divider circuit 34, which can connect between the output terminal of the switching power supply and the ground terminal, and may divide output voltage Vo by adopting resistors R1 and R2 to obtain voltage divider signal VFB1. Thus, the overvoltage information of the output voltage Vo can be obtained according to voltage division signal VFB1, thereby realizing the first stage overvoltage protection, and realizing the closed-loop control of output voltage Vo according to voltage division signal VFB1.

Figure 4:
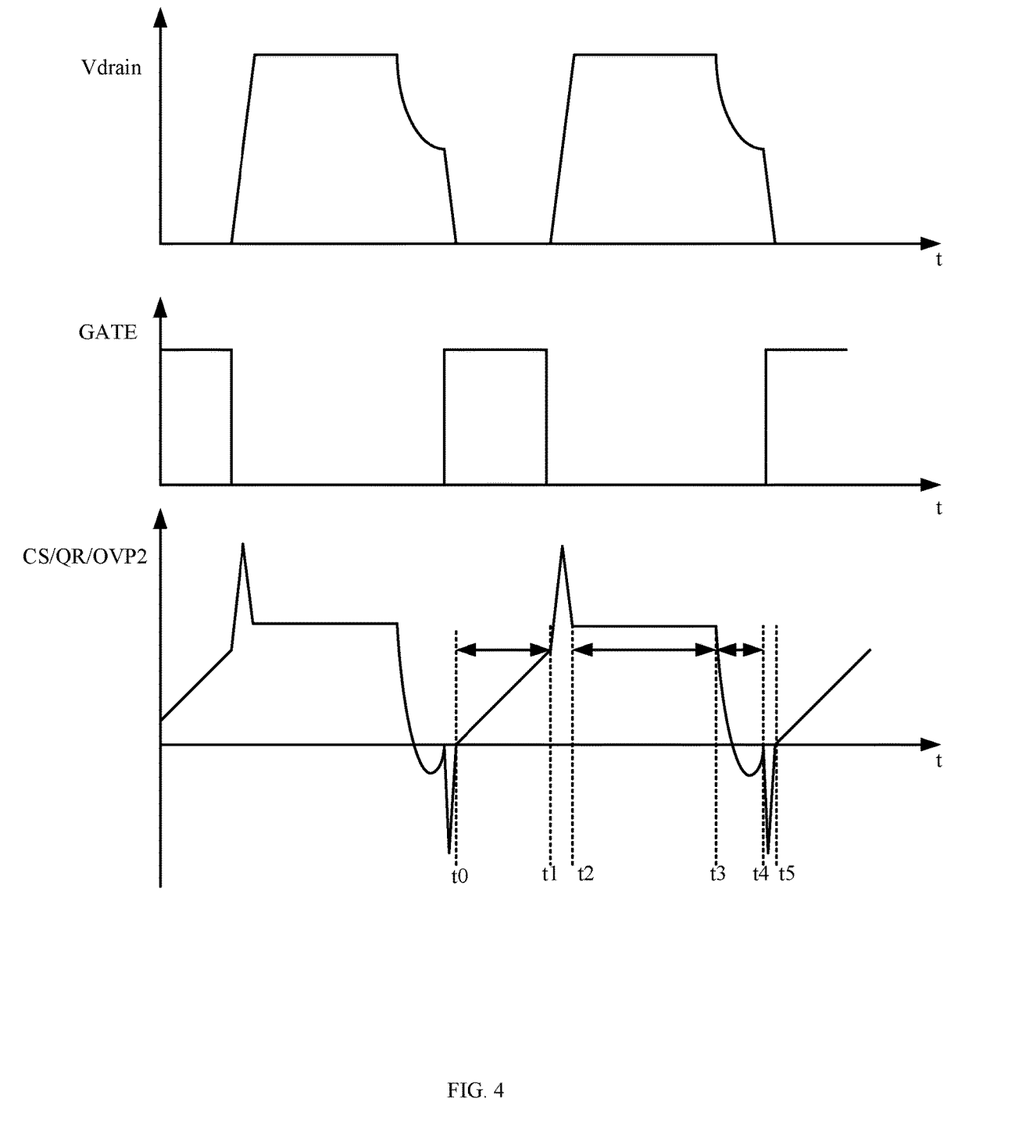
FIG. 4 is a waveform diagram of example operation of a switching power supply, in accordance with embodiments of the present invention.

Referring now to FIG. 4, shown is a waveform diagram of example operation of a switching power supply, in accordance with embodiments of the present invention. The composition and waveform characteristics of sampling signal Vsample in one switching cycle are analyzed below with reference to FIG. 3.

In period t0-t1, switching control signal GATE of main power transistor Q is at a high level, and main power transistor Q can be turned on. During this stage, drain-source voltage Vdrain of main power transistor Q is zero, and voltage divider signal VFB2 and differential signal Vdiff are all zero. Inductor current sampling signal IL1 obtained by current sampling circuit 331 may be transmitted to multiplexer detection pin CS/QR/OVP2 through resistors R3 and R5. So, in a first interval of a switching cycle, sampling signal Vsample may be formed by inductor current sampling signal IL1 representing inductor current IL during the conduction period of main power transistor Q. At time t1, switching control signal GATE of main power transistor Q is at a low level, and the next period t1-t2 is a period of masking time, which represents the time when main power transistor Q goes from an on state to a completely off state.

In period t2-t3, main power transistor Q can be completely turned off, and drain-source voltage Vdrain of main power transistor Q can be maintained at a fixed high level during this stage, so differential signal Vdiff is zero in this stage. Division signal VFB2 obtained by voltage divider circuit 333 can be directly transmitted to multiplexer detection pin CS/QR/OVP2, so sampling signal Vsample is formed by voltage division signal VFB2 representing drain-source voltage Vdrain of main power transistor Q in a second interval of a switching cycle.

In period t3-t4, main power transistor Q may remain off, and drain-source voltage Vdrain of main power transistor Q can drop significantly during this stage, so differential signal Vdiff also drops sharply and crosses zero during this stage. Differential signal Vdiff obtained by differential circuit 332 can be limited by current through resistor R5 and then transmitted to multiplexer detection pin CS/QR/OVP2. Therefore, sampling signal Vsample may be formed by differential signal Vdiff representing the change rate of drain-source voltage Vdrain of main power transistor Q in a third interval of a switching cycle.

In period t4-t5, main power transistor Q can be controlled to be turned on after a reasonable time delay; that is, main power transistor Q can be turned on at a valley of drain-source voltage Vdrain, thereby improving the efficiency, and so on.

Figure 5:
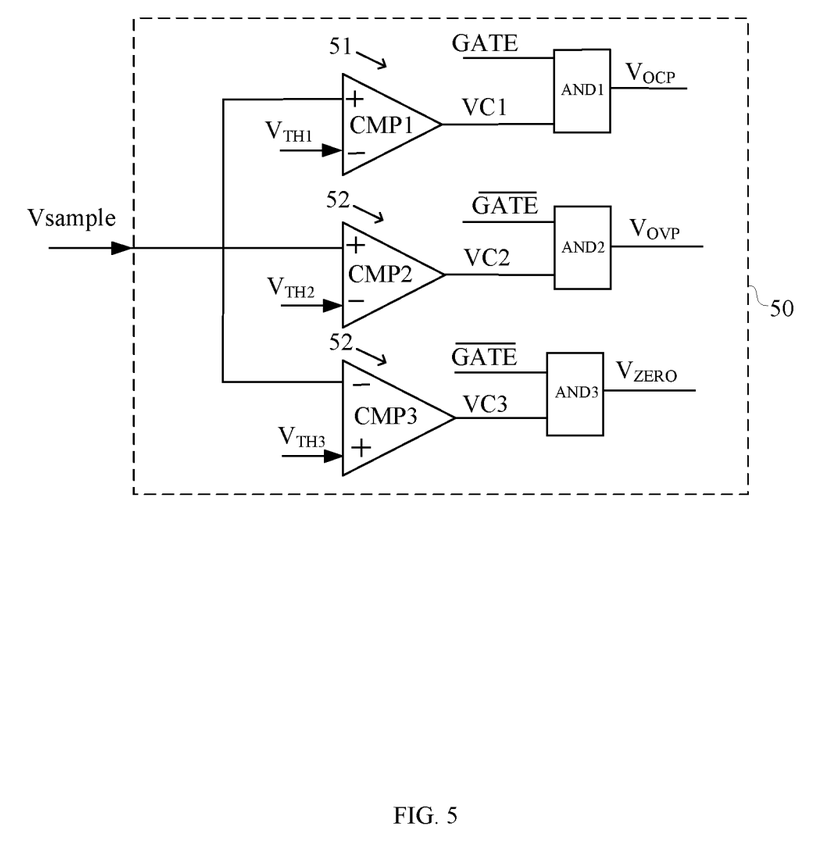
FIG. 5 is a schematic block diagram of an example detection circuit, in accordance with embodiments of the present invention.

Referring now to FIG. 5, shown is a schematic block diagram of an example detection circuit, in accordance with embodiments of the present invention. In this particular example, detection circuit 50 can include detection circuits 51, 52, and 53. For example, detection circuit 51 can receive sampling signal Vsample at multiplexer detection pin CS/QR/OVP2, and during the conduction period of main power transistor Q, when sampling signal Vsample reaches overcurrent threshold $V_{TH1}$ representing the inductor current overcurrent information, overcurrent signal $V_{OCP}$ can be activated, thereby realizing overcurrent protection.

Detection circuit 50 may also utilize sampling signal Vsample as inductor current sampling signal IL1 during the conduction period of main power transistor Q, such that main power transistor Q can be controlled according to inductor current sampling signal IL1. For example, detection circuit 51 can include comparator CMP1 and AND-gate circuit AND1. The non-inverting input terminal of comparator CMP1 may receive sampling signal Vsample, the inverting input terminal of comparator CMP1 may receive overcurrent threshold $V_{TH1}$, and the output terminal of comparator CMP1 can generate comparison signal VC1. AND-gate circuit AND1 may also receive comparison signal VC1 and switching control signal GATE of main power transistor Q, in order to generate overcurrent signal $V_{OCP}$ during the conduction period of main power transistor Q.

Detection circuit 52 can receive sampling signal Vsample at multiplexer detection pin CS/QR/OVP2. During the off period of main power transistor Q, when sampling signal Vsample reaches overvoltage threshold $V_{TH2}$ representing the output voltage overvoltage information of the switching power supply, overvoltage signal $V_{OVP}$ can be activated, indicating by overvoltage signal $V_{OVP}$ representing that the an output voltage is overvoltage, thereby realizing the second stage overvoltage protection. For example, detection circuit 52 can include comparator CMP2 and AND-gate circuit AND2. The non-inverting input terminal of comparator CMP2 may receive sampling signal Vsample, the inverting input terminal of comparator CMP2 may receive overvoltage threshold $V_{TH2}$, and the output terminal of comparator CMP2 can generate comparison signal VC2. AND-gate circuit AND2 may also receive comparison signal VC2 and the inverted signal of switching control signal GATE of main power transistor Q to output overvoltage signal $V_{OVP}$ during the period that main power transistor Q is turned off.

Detection circuit 53 can receive sampling signal Vsample at multiplexer detection pin CS/QR/OVP2. During the period that main power transistor Q is turned off, when sampling signal Vsample reaches zero-crossing threshold $V_{TH3}$ representing the zero-crossing information of the inductor current, zero-crossing signal $V_{ZERO}$ can be activated, thereby realizing valley switching. For example, detection circuit 53 can include comparator CMP3 and AND-gate circuit AND3. The inverting input terminal of comparator CMP3 may receive sampling signal Vsample, the non-inverting input terminal of comparator CMP3 may receive zero-crossing threshold $V_{TH3}$, and the output terminal of comparator CMP3 can generate comparison signal VC3. AND-gate circuit AND3 may also receive comparison signal VC3 and the inverted signal of switching control signal GATE of main power transistor Q to output zero-crossing signal $V_{ZERO}$ when main power transistor Q is turned off.

Therefore, when main power transistor Q is turned on, the waveform of sampling signal Vsample in the first interval can be used to detect inductor current IL for current control and overcurrent protection functions. When main power transistor Q is turned off, and after a certain shielding time, the waveform of sampling signal Vsample in the second interval can be used to detect drain-source voltage Vdrain of main power transistor Q, which may be used to realize second stage OVP detection. When inductor current IL crosses zero, the inductor of the PFC and the junction capacitor of main power transistor Q can begin to resonate, and the waveform of sampling signal Vsample in the third interval can be set to zero-crossing threshold $V_{TH3}$ slightly less than 0 mV. When sampling signal Vsample is detected to be less than zero-crossing threshold $V_{TH3}$, inductor current IL has crossed zero. Thus, main power transistor Q can turn on after a reasonable time delay, and main power transistor Q can be turned on at the valley of the drain-source voltage, in order to improve efficiency. When main power transistor Q is turned on, after shielding for a period of time, inductor current IL can be detected again, so that each switching cycle repeats.

In particular embodiments, the control circuit can detect the zero-crossing signal of the inductor current; that is, sampling signal Vsample in the third interval can be stronger and less susceptible to interference. After voltage divider circuit 34 may set the overvoltage point of the first stage OVP, the overvoltage point of the second stage OVP can also be flexibly set by setting the resistance values of the two voltage divider resistors in voltage divider circuit 333, in order to improve reliability.

Particular embodiments aim to improve the utilization rate of the pin resources of the control chip and at the same time enrich the functions of the control chip. Therefore, the control circuit of certain embodiments can detect the zero-crossing of the inductor current to realize the valley switching, current sampling for current control and overcurrent protection. The functions of flexible setting of output overvoltage protection of the second stage are integrated and multiplexed on the same pin resource, which can substantially improve the utilization rate of pin resources of the control chip. Also in particular embodiments, the circuit structure is relatively simple and reliable.

Figure 6:
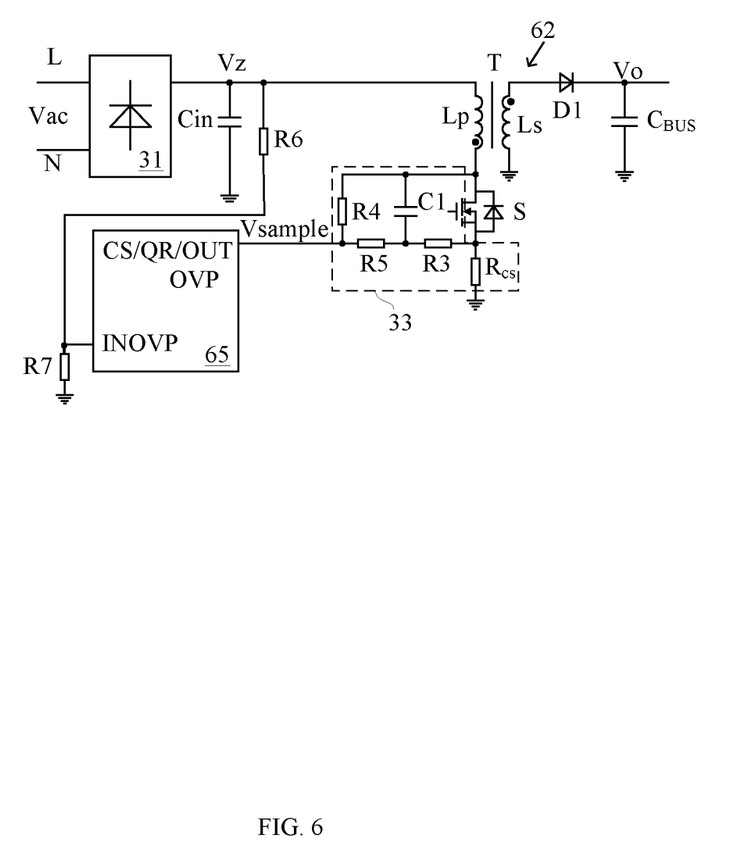
FIG. 6 is a schematic block diagram of a second example switching power supply, in accordance with embodiments of the present invention.

Referring now to FIG. 6, shown is a schematic block diagram of a second example switching power supply, in accordance with embodiments of the present invention. In this particular example, power stage circuit 62 is of a flyback topology, and power stage circuit 62 can include primary winding Lp and main power transistor S connected in series between the output terminal of rectifier circuit 31 and the ground terminal, secondary winding Ls coupled with primary winding Lp, and rectifier diode D1 connected with secondary winding Ls. Power stage circuit 62 can also include a voltage divider circuit for dividing DC input voltage Vz, and the voltage divider circuit can include resistors R6 and R7 connected in series. The voltage divider circuit can obtain the input voltage information of power stage circuit 62 and feed it back to pin INOVP of control chip 65, thereby realizing overvoltage protection for the input voltage.

In particular embodiments, the control circuit can include sampling circuit 33 and control chip 65. Control chip 65 can include a detection circuit. Sampling circuit 33 may obtain inductor current IL in power stage circuit 62 and drain-source voltage Vdrain of main power transistor S, in order to generate sampling signal Vsample. Further, sampling signal Vsample can be transmitted to detection circuit 36 inside control chip 65 through multiplexer detection pin CS/QR/OVP of control chip 65, and the detection circuit may receive sampling signal Vsample and generate inductor current sampling signal IL1, overcurrent signal $V_{OCP}$, zero-crossing signal $V_{ZERO}$, and overvoltage signal $V_{OVP}$. Overvoltage signal $V_{OVP}$ can indicate whether the output is in an overvoltage state. In this way, the control circuit of particular embodiments can complete current detection and zero-crossing detection, and also cooperate with the voltage divider circuit at the input terminal to simultaneously detect input voltage overvoltage and output voltage overvoltage without auxiliary windings.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. A control circuit for a switching power supply, the control circuit comprising:
    a) a sampling circuit configured to obtain an inductor current and a drain-source voltage of a main power transistor in a power stage circuit, in order to generate a sampling signal;
    b) wherein the control circuit generates an inductor current sampling signal according to the sampling signal during an on-period of the main power transistor,
    c) wherein during an off-period of the main power transistor, the control circuit generates a zero-crossing signal of the inductor current and an overvoltage signal of an output voltage of the switching power supply according to the sampling signal; and
    d) wherein the sampling circuit comprises a current sampling circuit configured to obtain the inductor current and generate the inductor current sampling signal, a differential circuit comprising a first capacitor and a third resistor, and being configured to generate a differential signal by differentiating the drain-source voltage when the main power transistor is turned off, and a voltage divider circuit configured to divide the drain-source voltage to obtain a voltage divider signal when the main power transistor is turned off.

2. The control circuit of claim 1, wherein the control circuit comprises a control chip, the sampling signal is transmitted to a detection circuit inside the control chip through a multiplexer detection pin, and the detection circuit receives the sampling signal and generates the inductor current sampling signal, the zero-crossing signal, and the overvoltage signal.

3. The control circuit of claim 2, wherein a first terminal of the differential circuit is connected to a drain of the main power transistor, a second terminal of the differential circuit is connected to a source of the main power transistor, a third terminal of the differential circuit is coupled to the multiplexer detection pin.

4. The control circuit of claim 3, wherein a first terminal of the voltage divider circuit is connected to the drain of the main power transistor, a second terminal of the voltage divider circuit is connected to the source of the main power transistor through the differential circuit, and a third terminal of the voltage divider circuit is connected to the multiplexer detection pin, and the voltage divider signal is generated at the third terminal of the voltage divider circuit.

5. The control circuit of claim 3, wherein a first terminal of the voltage divider circuit is connected to the drain of the main power transistor, a second terminal of the voltage divider circuit is connected to the source of the main power transistor, and a third terminal of the voltage divider circuit is connected to the multiplexer detection pin through the differential circuit, and the voltage divider signal is generated at the third terminal of the voltage divider circuit.

6. The control circuit of claim 5, wherein the sampling circuit comprises a current limiting resistor, and the differential circuit is connected to the multiplexer detection pin through the current limiting resistor.

7. The control circuit of claim 3, wherein a first terminal of the first capacitor is connected to the drain of the main power transistor, and a second terminal of the first capacitor is connected to one terminal of the third resistor, the other terminal of the third resistor is connected to the source of the main power transistor, the second terminal of the first capacitor is also coupled to the multiplexer detection pin.

8. The control circuit of claim 2, wherein the detection circuit comprises a first detection circuit for receiving the sampling signal at the multiplexer detection pin, and during the on-period of the main power transistor, when the sampling signal reaches an overcurrent threshold representing inductor current overcurrent information, an overcurrent signal is activated.

9. The control circuit of claim 2, wherein the detection circuit is configured to receive the sampling signal at the multiplexer detection pin, and the sampling signal is configured as the inductor current sampling signal during the on-period of the main power transistor.

10. The control circuit of claim 2, wherein the detection circuit comprises a second detection circuit for receiving the sampling signal at the multiplexer detection pin, and during the off-period of the main power transistor, when the sampling signal reaches an overvoltage threshold representing output voltage overvoltage information, the overvoltage signal is activated.

11. The control circuit of claim 2, wherein the detection circuit comprises a third detection circuit for receiving the sampling signal at the multiplexer detection pin, and during the off-period of the main power transistor, when the sampling signal reaches a zero-crossing threshold representing a zero-crossing information of the inductor current, the zero-crossing signal is activated.

12. The control circuit of claim 1, wherein in one switching cycle, a first interval of the sampling signal is configured as the inductor current sampling signal representing the inductor current during the on-period of the main power transistor.

13. The control circuit of claim 1, wherein in one switching cycle, a second interval of the sampling signal is configured as a voltage divided signal representing the drain-source voltage of the main power transistor.

14. The control circuit of claim 1, wherein in one switching cycle, a third interval of the sampling signal is configured as a differential signal representing a change rate of the drain-source voltage of the main power transistor.

15. The control circuit of claim 1, wherein the control circuit is configured to obtain an overcurrent signal of the inductor current according to the sampling signal during the on-period of the main power transistor.

* * * * *